United States Patent
Laur et al.

(10) Patent No.: US 11,009,590 B2
(45) Date of Patent: May 18, 2021

(54) ANNOTATION OF RADAR-PROFILES OF OBJECTS

(71) Applicant: Aptiv Technologies Limited, St. Michael (BB)

(72) Inventors: Michael H. Laur, Mission Viejo, CA (US); Indu Vijayan, Sunnyvale, CA (US); Divya Balachandran, Sunnyvale, CA (US); Nandita Mangal, Palo Alto, CA (US)

(73) Assignee: Aptiv Technologies Limited, St. Michael (BB)

( * ) Notice: Subject to any disclaimer, the term of this patent is extended or adjusted under 35 U.S.C. 154(b) by 222 days.

(21) Appl. No.: 16/117,709

(22) Filed: Aug. 30, 2018

(65) Prior Publication Data

US 2020/0072943 A1    Mar. 5, 2020

Related U.S. Application Data

(60) Provisional application No. 62/724,080, filed on Aug. 29, 2018.

(51) Int. Cl.
*G01S 7/41* (2006.01)
*G01S 13/86* (2006.01)
*G01S 13/931* (2020.01)

(52) U.S. Cl.
CPC ............ *G01S 7/411* (2013.01); *G01S 13/867* (2013.01); *G01S 13/931* (2013.01)

(58) Field of Classification Search
CPC ...... G01S 13/931; G01S 13/58; G01S 13/867; G01S 7/411
See application file for complete search history.

(56) References Cited

U.S. PATENT DOCUMENTS

| | | | |
|---|---|---|---|
| 9,097,800 B1 | 8/2015 | Zhu | |
| 9,244,159 B1 * | 1/2016 | Korchev | G01S 7/414 |
| 10,000,153 B1 * | 6/2018 | Misu | B60Q 9/008 |
| 2004/0178945 A1 * | 9/2004 | Buchanan | G01S 13/867 |
| | | | 342/70 |
| 2014/0152488 A1 | 6/2014 | Baba | |
| 2016/0238703 A1 * | 8/2016 | Liu | G01S 13/867 |
| 2019/0071014 A1 * | 3/2019 | Misu | G06K 9/00805 |
| 2019/0293787 A1 * | 9/2019 | Sakai | B60R 21/00 |
| 2019/0340775 A1 * | 11/2019 | Lee | G05D 1/0212 |
| 2019/0385334 A1 * | 12/2019 | Hong | G01S 17/08 |

FOREIGN PATENT DOCUMENTS

WO    03/001472 A1    1/2003

OTHER PUBLICATIONS

European Search Report for 19191750, European Patent Office, dated Jan. 29, 2020.

* cited by examiner

*Primary Examiner* — Timothy X Pham
(74) *Attorney, Agent, or Firm* — Colby Nipper PLLC

(57) ABSTRACT

A radar-data collection system a radar, a camera, and a controller-circuit. The radar and the camera are intended for mounting on a host-vehicle. The radar is configured is to indicate a radar-profile of an object detected by the radar. The camera is configured to render an image of the object. The controller-circuit is in communication with the radar and the camera. The controller is configured to determine an identity of the object in accordance with the image, and annotate the radar-profile in accordance with the identity.

18 Claims, 3 Drawing Sheets

ANNOTATION OF RADAR-PROFILES OF OBJECTS

TECHNICAL FIELD OF INVENTION

This disclosure generally relates to a radar-data collection system, and more particularly relates to a system that determines an identity of an object in accordance with an image from a camera, and annotates the radar-profile from a radar in accordance with the identity.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
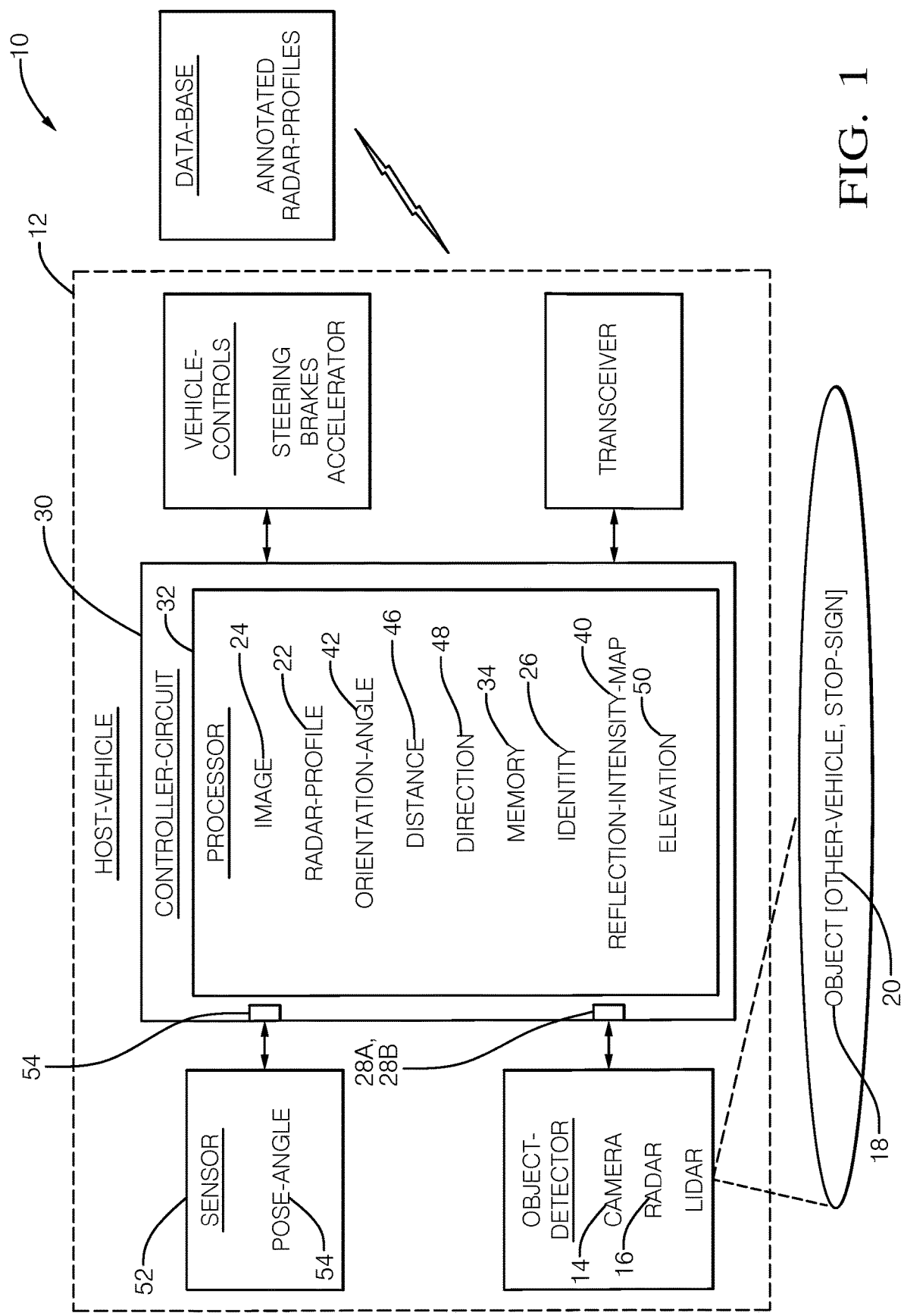
FIG. 1 is a diagram of a radar-data collection system in accordance with one embodiment.

FIG. 1 illustrates a non-limiting example of a radar-data collection system 10, hereafter often referred to as the system 10. As will be described in more detail below, the system 10 is useful to create a library of radar-profiles that are radar-returns annotated with various information such as, but not limited to, the identity of the object (e.g. another-vehicle or a stop-sign) detected by a radar. Those in the automated-vehicle object-detection arts will recognize that the identity of an object is often more readily determine based on an image from a camera rather than a radar-return from radar. The library of radar-profiles will be useful for continued operation of a host-vehicle 12 if a camera 14 on the host-vehicle 12 is damaged or otherwise inoperable where the radar 16 is relied upon to determine the identity of the object. It is contemplated that the teachings herein are also applicable to annotating cloud-points from a lidar so that a library of lidar-maps could be generated and subsequently used for more effective control of the host-vehicle 12 if the camera were to fail, with or without the presence of the radar 16 in the system 10.

The host-vehicle 12 may be characterized as an automated vehicle, and may be referred to by some as an automated-mobility-on-demand (AMOD) type of vehicle. As used herein, the term automated vehicle may apply to instances when the host-vehicle 12 is being operated in an automated-mode, i.e. a fully autonomous mode, where a human-operator (not shown) of the host-vehicle 12 may do little more than designate a destination to operate the host-vehicle 12. However, full automation is not a requirement. It is contemplated that the teachings presented herein are useful when the host-vehicle 12 is operated in a manual-mode where the degree or level of automation may be little more than providing an audible or visual warning to the human-operator who is generally in control of the steering, accelerator, and brakes of the host-vehicle 12. For example, the system 10 may merely assist the human-operator as needed to change lanes and/or avoid interference with and/or a collision with, for example, an object 18 such as an other-vehicle 20.

As suggested above, the system 10 includes a camera 14 and a radar 16 that is generally configured or designed for mounting on the host-vehicle 12. To be suitable for mounting on the host-vehicle 12, the camera 14 and the radar 16 are designed to be reliably operable when subjected to environmental conditions experienced by vehicles such as rain, snow, dirt, chemical contamination, temperature extremes, and the like. Those in the automotive sensing arts will instantly recognize what features are desirable for the camera 14 and the radar 16 to be suitable for use on the host-vehicle 12.

The radar 16 is configured to indicate (i.e. output a signal indicative of or contributing to) a radar-profile 22 of an instance of the object 18 detected by the radar 16. As used herein, the radar-profile 22 may include, but is not limited to, copies of radar-returns (i.e. a copy of a signal output by the radar 16), a mapping (a post processed signal output by the radar 16) of distances and/or directions from the radar 16 to various points on the object 18, and/or mapping of range-rate of one or more points on the object 18, i.e. how fast the object 18 or points of the object 18 are moving relative to (e.g. towards or away from) the radar 16. The distance and range-rate information may be stored as time-domain or frequency-domain data, as will be recognized by those in radar signal processing arts. The radar 16 may be a two-dimensional (2D) type of radar that indicates a distance and a direction (e.g. an azimuth-angle) to an instance of a radar return, or may be a three-dimensional (3D) type of radar that also indicates an elevation-angle.

As will be explained in more detail later, the radar-profile 22 may include information that may not be readily obtainable directly from signals output by the radar 16. For example, an image 24 from the camera 14 may be readily analyzed using known processes to determine an identity 26 (e.g. small car, trash-bin, large truck, train, stop-sign, yield-sign, railroad-crossing-sign) of the object 18. Those in the radar signal processing arts will recognized that various similar sized objects may be difficult to distinguish, i.e. determine the identity 26 of, using only radar-returns from the radar 16. However, the inventors have discovered that once that information (e.g. the identity 26) is known and associated with an instance of the radar-profile 22 by way of annotation of the radar-profile 22, then each instance of the radar-profile 22 may be referred to at some future date to, for example, determine the identity 26 of the object using only radar-returns from the radar 16.

The camera 14 may be a monoscopic or stereoscopic or stereoscopic type of camera that is configured to render the image 24 of the object 18. The image 24 may be a single snap-shot of the object 18, or may be a video composed of a plurality of snap-shots. The camera 14 may be sensitive to visible-light and/or infrared-light. The camera 14 may be co-located with the radar 16 as part of an object-detector as suggested in FIG. 1, or the camera 14 may be spaced apart from the radar 16. For example, the camera may be mounted on the roof of the host-vehicle 12, and the radar 16 may be mounted at the front of the host-vehicle 12, e.g. near the headlights or bumper of the host-vehicle 12. The object-detector may be all or part of a perception-sensor used for autonomous operation of the host-vehicle 12.

The system 10 includes a controller-circuit 30 in communication with the radar 16 via a first-input 28A, and in communication with the camera 14 via a second-input 28B. The communication may be by way of, but not limited to, wires, fiber-optic, or wireless-communications, as will be recognized by those in the art. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, or separate from the controller 30 such as remote memory stored in the cloud. The one or more routines may be executed by the controller 30 or the processor 32 to perform steps for determining the radar-profile 22 based on signals received by the controller 30 from the camera 14 and the radar 16. The controller 30 is configured (e.g. programmed) to determine the identity 26 (e.g. car, truck, stop-sign) of the object 18 in accordance with the image 24, and annotate (i.e. document, characterize, or label) the radar-profile 22 in accordance with the identity 26.

Figures 2A, 2B:
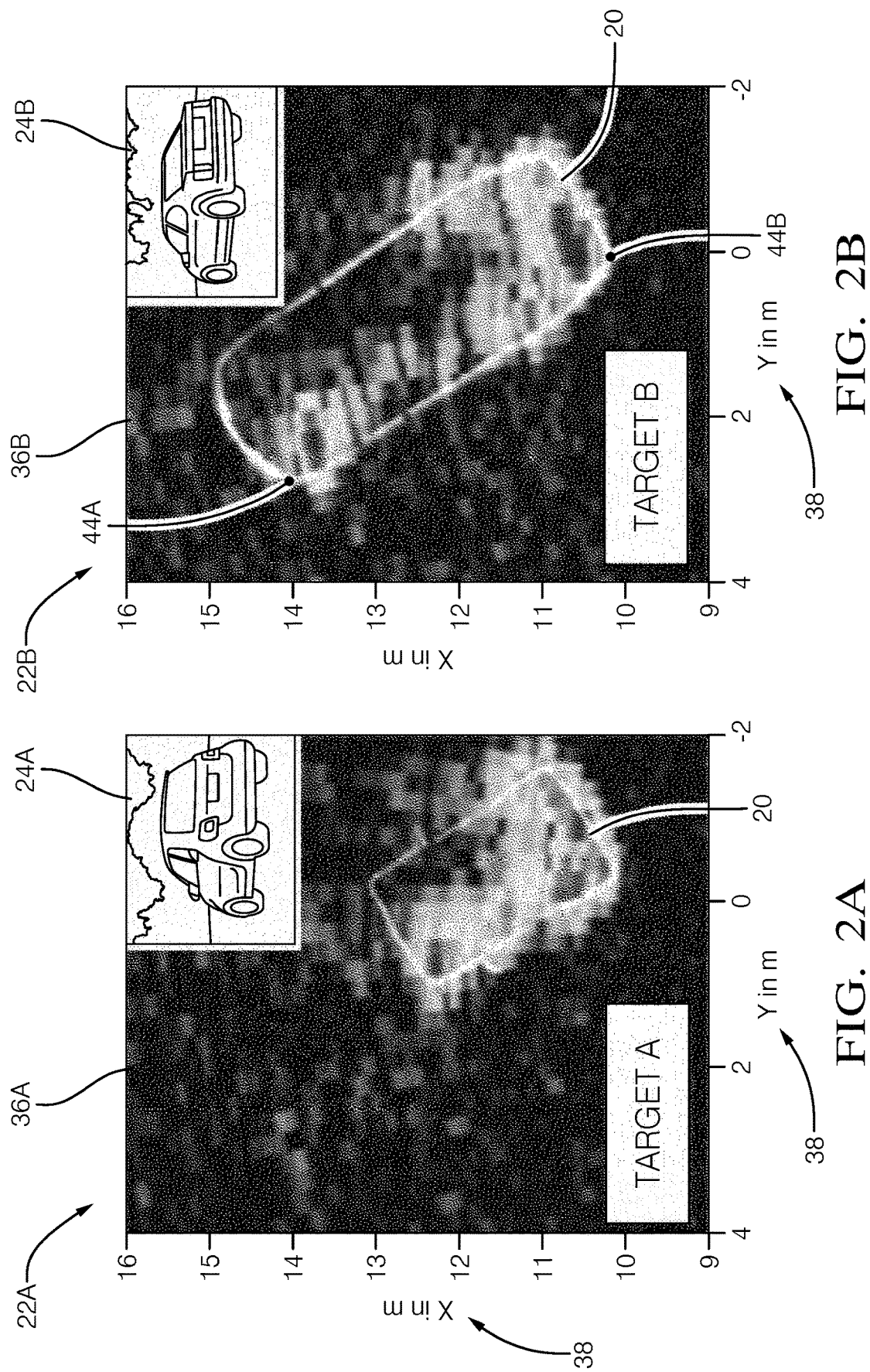
FIGS. 2A and 2B are examples of radar-profiles determined by the system of FIG. 1 in accordance with one embodiment.

FIGS. 2A and 2B illustrate non-limiting examples of radar-profile 22A and radar-profile 22B. In this example, the radar-profiles are a 'bird's-eye' or overhead perspective mapping transposition of radar-return 36A and radar-return 36B detected by the radar 16, and include image 24A and image 24B that are associated with radar-return 36A and radar-return 36B, respectively, each of which in this example may be characterized as a reflection-intensity-map 40. The radar-profiles also include annotations 38 that indicate the distance to each instance of the other-vehicle, which may be used to determine a size of the other-vehicle in each radar-profile using known geometric algorithms. The images may be analyzed using known image comparison techniques to determine the make/model of each of the other-vehicles shown. Once the radar-profiles are annotated, the radar-profiles may be stored (for future reference) in the memory 34 on-board the host-vehicle 12 and/or stored remotely in a data-base of annotated radar-profiles, which may be a shared data-base accessible by other vehicles. Accordingly, the system 10 may include a transceiver (e.g. Wi-Fi, cellular-network, etc.) used to upload/download the annotated radar-profiles, and later access a library of the annotated radar-profiles.

Continuing to refer to FIGS. 1, 2A, and 2B, the controller-circuit 30 may be configured to determine an orientation-angle 42 of the object 18 in accordance with, or based on, the radar-profile 22. For example, if the radar-profile includes a distance-map as suggested in FIG. 2B, and a first-corner or first-edge 44A of the object 18 is further away than a second-corner or a second-edge 44B, then that is an indication that the object 18 is not oriented normal to the host-vehicle 12. Known geometry techniques can be used to determine the orientation-angle 42. It is further contemplated that a nominal-distance to object 18, a radar-angle (angle between the first-edge 44A and the second-edge 44B), and the orientation-angle 42 can used to determine an object-length, e.g. the length (or width) of the object 18. By annotating the radar-profile 22 with the orientation-angle 42, a future instance of a radar-return can be more reliably compared to the annotated radar-profile stored in the data-base.

Alternatively, or additionally, the controller-circuit 30 may be configured to determine the orientation-angle 42 of the object 18 in accordance with the image 24. For example, the orientation angle 42 of another-vehicle can be determined from the image 24 by comparing the height in the image 24 of the bottom edge of the front and rear tires of the vehicle in the image. As above, the orientation-angle 42 can be used to further annotate the radar-profile 22.

As noted above and shown in FIGS. 2A and 2B, the controller-circuit 30 may be configured to determine a reflection-intensity-map 40 in accordance with the radar-profile. The reflection-intensity-map 40 indicates the signalstrength of the reflected radar-signal at various locations in the file of view of the radar 16. FIGS. 2A and 2B show two-dimensional reflection-intensity maps, and three-dimensional reflection-intensity-maps are contemplated, although they would be difficult to illustrate here as those in the art would recognize. The reflection-intensity-map of a vehicle suggests that the object has some depth as radar signal may pass through and/or under (reflected by the ground) a vehicle and be reflected by a surface other than what is directly viewable. By contrast, the reflection-intensity-map of a stop-sign would not show any depth, assuming there was not some other object close behind the stop-sign.

It should now be appreciated that the reflection-intensity-map 40 of a previously stored instance of the radar-profile 22 can be compared to a reflection-intensity-map of a recently received radar-return, and if the two reflection-intensity maps correspond well, then the identity 26 associated with that previously stored instance of the radar-profile 22 can be presumed to be the identity 26 of the recently received radar-return. That a recently received radar-return corresponds to a previously stored instance of the radar-profile 22 may be determined with a statistical comparison of reflection-intensity-maps and/or other known radar-target comparison algorithms The reflection-intensity-map 40 may be store in terms of time-domain or frequency-domain, which may depend on the type of radar being used.

The controller-circuit 30 may be configured to determine a distance 46 and/or a direction 48 and/or an elevation 50 to the object 18 in accordance with the radar-profile, and annotate the radar-profile 22 in accordance with the distance 46 and/or the direction 48 and/or the elevation 50. These relatively simple annotations (the values of the orientation-angle 42 the distance 46 and/or the direction 48 and/or the elevation 50) may be used as search markers or tabs to facilitate searching the data-base for a corresponding radar-profile. Other relatively simple characteristics or values such as, but not limited to, object-depth, object-length, object-height, mobile vs. stationary can be used to further annotate the radar-profile 22 and further facilitate searching for a corresponding, for example, reflection-intensity-map.

The system 10 may also include a sensor 52 mounted on the host-vehicle 12. The sensor 52 is configured to indicate a pose-angle 54 that may be any one or combination of, but not limited to, pitch-angle, roll-angle, yaw-angle. The sensor 52 may also indicate, for example, global-position, speed, heading, acceleration/deceleration of the host-vehicle 12. The controller-circuit 30 is in communication with the sensor 52 via a third-input 54. The communication may be by way of, but not limited to, wires, fiber-optic, or wireless-communications, as will be recognized by those in the art. If the pose-angle 54 is something other than level, data collected from the camera 14, the radar 16, and/or the lidar may need to be compensated so that the frame of reference of all radar-profiles is consistent. Accordingly, the controller-circuit 30 is configured to annotate the radar-profile 22 in accordance with the pose-angle 54.

The controller-circuit 30 (or the processor 32) may also be configured to operate the host-vehicle 12 in accordance with the radar-profile 22 in response to a determination that a recently received radar-return or radar-map corresponds to the radar-profile 22. That is, as suggested above and by way of example, the system 10 or the controller 30 or the processor 32 compares a recent radar-return to a previously stored radar-profiles to determine the identity of an object 18 when the camera is not available, and given that knowledge of the identity of the object 18, operates the host-vehicle 12 accordingly. Operation of the host-vehicle 12 may include autonomous (i.e. driverless) operation of the vehicle-controls which includes operating the steering, brakes, and accelerator of the host-vehicle 12.

Figure 3:
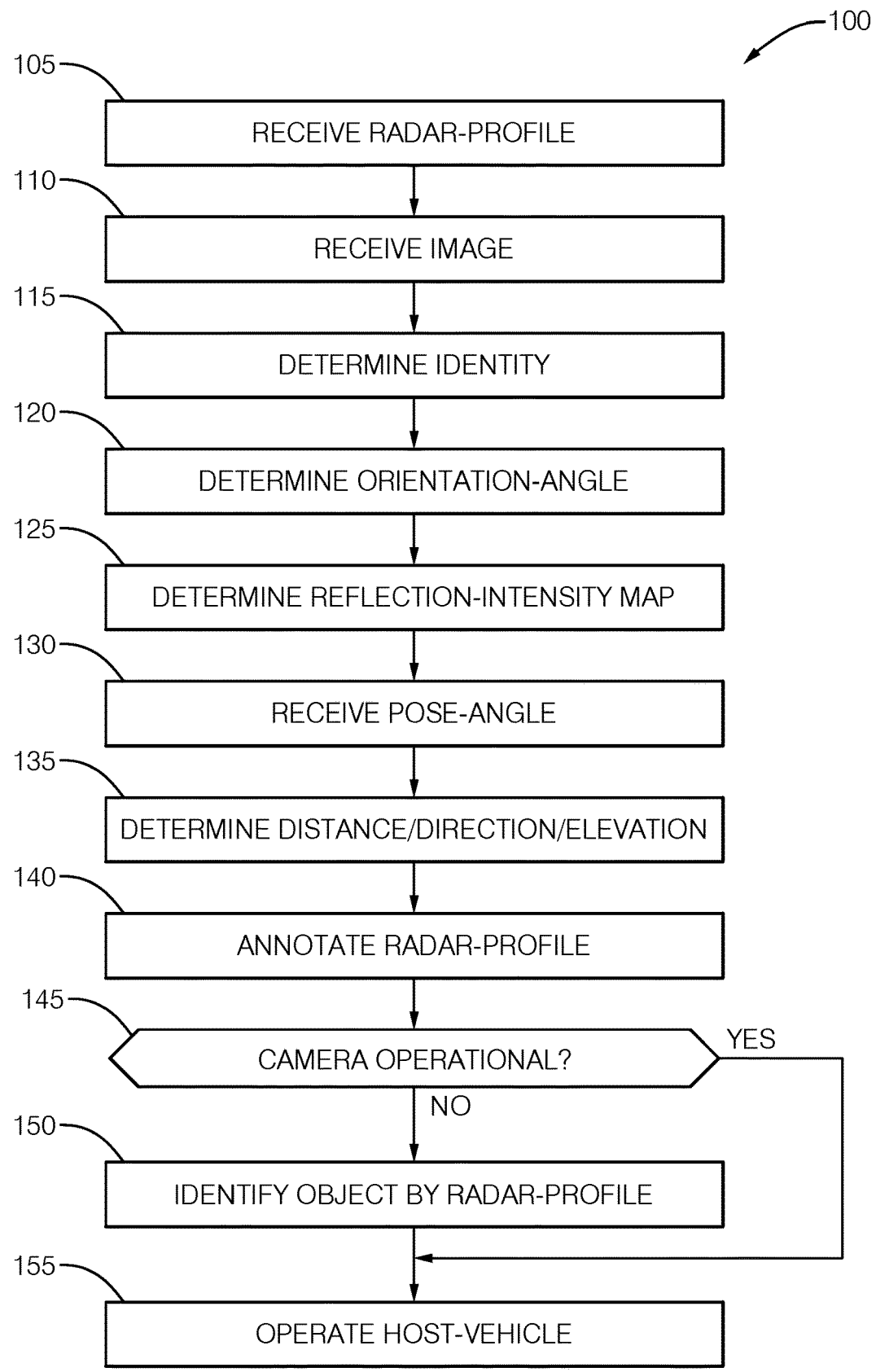
FIG. 3 is a method of operating the system of FIG. 1 in accordance with one embodiment.

FIG. 3 illustrates a non-limiting example of a method 100 of operating a radar-data collection system 10. As will be explained in more detail below, the method 100 helps to overcome the problem of how to continue operating the host-vehicle 12 if the camera 14 has been obstructed (e.g. covered with mud, ice, or bugs), damaged, or is otherwise not functional.

Step 105, RECEIVE RADAR-PROFILE, may include receiving a radar-return by the radar 16, and generating a radar-profile 22 of an object 18 detected by the radar 16.

Step 110, RECEIVE IMAGE, may include receiving an image 24 of the object 18 rendered by the camera 14. If the camera 14 and the radar 16 have different perspectives of a similar field-of-view because the camera 14 and the radar 16 are spaced apart, receiving the image may also include applying a known transposition algorithm to the image 24 to correct for the differences of perspective.

Step 115, DETERMINE IDENTITY, may include determining an identity of the object 18 by way of image-processing the image 24, which may include comparing the image 24 to a library of identified-images stored in the data-base. The comparison of the image to the library of identified-images may be by way of, but not limited to, known neural-network algorithms.

Step 120, DETERMINE ORIENTATION-ANGLE, is an optional step that may include determining an orientation-angle 42 of the object 18 in accordance with the radar-profile 22 OR determining an orientation-angle of the object in accordance with the image 24. As used herein, the orientation-angle 42 is an indication of the angle of the object relative to a bore-site of the camera 14 and/or the radar 16, where an orientation-angle 42 of zero (00) corresponds to a major plane of the object being normal (i.e. perpendicular) to the bore-site of the camera 14 and/or the radar 16.

Step 125, DETERMINE REFLECTION-INTENSITY-MAP, is an optional step that may include determining a reflection-intensity-map 40 in accordance with (i.e. based on) the radar-profile 22 which is determined from the instant radar-return.

Step 130, RECEIVE POSE-ANGLE, is an optional step that may include receiving a pose-angle 54 of a host-vehicle 12 from a sensor 52 such as an accelerometer or gravity-direction-detector.

Step 135, DETERMINE DISTANCE/DIRECTION/ELEVATION, is an optional step that may include determining a distance 46 and/or a direction 48 and or an elevation 50 to the object 18 in accordance with the radar-profile 22.

Step 140, ANNOTATE RADAR-PROFILE, may include annotating the radar-profile with any one or combination of, but not limited to, the identity, the orientation-angle, the reflection-intensity-map, the pose-angle, the distance, the direction, and the elevation. As used herein, to annotate the radar-profile means to record the information with processed and/or unprocessed radar-returns. Once annotated, the instant radar-profile 22 may be stored in the data-base as part of a library of annotated radar-profiles that can be accessed/referenced at some later time/date as needed. The annotations 38 may be used as search parameters to accelerate the searching of the annotated radar-profiles stored in the database. The acceleration of the search is the result of being able to search/compare relatively simple values rather than only being able to make direct comparisons of radar-data.

Step 145, CAMERA OPERATIONAL?, may include sending an image-request to the camera 14 and verifying that an image has been provided and optionally that the image as changed from a previous image. That is, verifying that the camera 14 is not outputting an image or stuck outputting the same image even though the host-vehicle 12 has moved enough that the image should have changed. If the camera 14 is deemed to not be operational (NO), the method 100 proceeds to step 150. If the camera is functioning (YES), then the image 24 may be used to identify the object 18 for operating the host-vehicle 12 in step 155.

Step 150, IDENTIFY OBJECT BY RADAR-PROFILE, may include ignoring the image 24 from the camera 14 and determining whatever annotation information can be determine from the radar-signal, and then accessing the data-base to search the annotated radar-profiles and determine the identity 26 of the object based on the radar-profile 22 rather than the image 24.

Step 155, OPERATE HOST-VEHICLE, may include the controller 30 (or the processor 32) operating the vehicle-controls to control the movement of the host-vehicle 12 to, for example, transport a passenger of the host-vehicle 12 to a destination. That is, operating the host-vehicle 12 in accordance with the radar-profile 22 in response to a determination that a radar-map (i.e. the instant radar-return received from the radar 16) corresponds to the radar-profile 22, which may have been previously stored in the data-base.

Described herein is a first device 30 that includes one or more processors 32; memory 34; and one or more programs 105-155 stored in memory 34. The one or more programs 105-155 including instructions for performing all or part of the method 100. Also, described herein is a non-transitory computer-readable storage-medium 34 that includes one or more programs 105-155 for execution by one or more processors 32 of a first device 30, the one or more programs 105-155 including instructions which, when executed by the one or more processors 32, cause the first device to perform all or part of the method 100.

Accordingly, a radar-data collection system (the system 10), a controller 30 for the system 10, and a method 100 of operating the system 10 are provided. Radar-profiles 22 are generated by annotating data/signals from a radar 16 and a camera 14, and then stored for later use if/when the camera 14 is not functional. By annotating the radar-profiles, the searching of a library of radar-profiles is accelerated as the annotations can be used as search parameters rather than having to perform a time-consuming one-to-one comparison of recorded radar-returns. That is, the annotations can be used to sort or catalog the radar-profiles that make up the library, thereby enabling an accelerated search.

While this invention has been described in terms of the preferred embodiments thereof, it is not intended to be so limited, but rather only to the extent set forth in the claims that follow.

We claim:

1. A system, comprising:
a controller circuit configured to:
receive radar data representing detections of an object proximate a host vehicle;
receive image data representing a captured image of the object;
determine an identity of the object based on the image data;
determine, based on the radar data and the image data, a radar profile including a two-dimensional representation of the radar data relative to a host vehicle coordinate system and an associated image of the object;
annotate the radar profile in accordance with the identity and an orientation of the object by labeling the radar profile with the image, the identity, and the orientation of the object;
determine a distance and a direction to the object in accordance with the radar profile; and
annotate the radar profile in accordance with the distance and the direction.

2. The system in accordance with claim 1, wherein the controller circuit is configured to:
determine an orientation angle of the object in accordance with the radar profile; and
annotate the radar profile in accordance with the orientation angle.

3. The system in accordance with claim 1, wherein the controller circuit is configured to:
determine an orientation angle of the object in accordance with the image data; and
annotate the radar profile in accordance with the orientation angle.

4. The system in accordance with claim 1, wherein the controller circuit is configured to:
determine a reflection intensity map in accordance with the radar profile; and
annotate the radar profile in accordance with the reflection intensity map.

5. The system in accordance with claim 1, wherein the system includes a sensor mounted on the host vehicle, the controller circuit is in communication with the sensor, said sensor is configured to indicate a pose angle of the host vehicle, the pose angle being one or more of a pitch angle, a roll angle, and a yaw angle of the host vehicle, and the controller circuit is configured to annotate the radar profile in accordance with the pose angle.

6. The system in accordance with claim 1, wherein the controller circuit is configured to:
determine an elevation to the object in accordance with the radar profile; and
annotate the radar profile in accordance with the elevation.

7. The system in accordance with claim 1, wherein the controller circuit is configured to operate the host vehicle in accordance with the radar profile in response to a determination that a radar map corresponds to the radar profile.

8. The system in accordance with claim 1, wherein annotating the radar profile includes the controller circuit recording object information along with the radar data from the object.

9. The system in accordance with claim 1, wherein the controller circuit is configured to upload the annotated radar profile to a data base that is accessible by other vehicles.

10. A method, comprising:
receiving, with a controller circuit, radar data representing detections of an object proximate to a host vehicle;
receiving, with the controller circuit, image data representing a captured image of the object;
determining, with the controller circuit, an identity of the object based on the image data;
determining, with the controller circuit based on the radar data and the image data, a radar profile including a two-dimensional representation of the radar data relative to a host vehicle coordinate system and an associated image of the object;
annotating the radar profile in accordance with the identity and an orientation of the object by labeling the radar profile with the image, the identity, and the orientation of the object; and annotating the radar profile in accordance with the distance and the direction by determining a distance and a direction to the object in accordance with the radar profile.

11. The method in accordance with claim 10, including:

determining an orientation angle of the object in accordance with the radar profile; and annotating the radar profile in accordance with the orientation angle.

12. The method in accordance with claim 10, including:

determining an orientation angle of the object in accordance with the image data; and annotating the radar profile in accordance with the orientation angle.

13. The method in accordance with claim 10, including:

determining a reflection intensity map in accordance with the radar profile; and annotating the radar profile in accordance with the reflection intensity map.

14. The method in accordance with claim 10, including:

receiving a pose angle of a host vehicle from a sensor, the pose angle being one or more of a pitch angle, a roll angle, and a yaw angle of the host vehicle; and annotating the radar profile in accordance with the pose angle.

15. The method in accordance with claim 10, including:

determining an elevation to the object in accordance with the radar profile; and annotating the radar profile in accordance with the elevation.

16. The method in accordance with claim 10, including operating a host vehicle in accordance with the radar profile in response to a determination that a radar map corresponds to the radar profile.

17. The method in accordance with claim 10, wherein annotating the radar profile includes recording object information along with the radar data from the object.

18. The method in accordance with claim 10, including uploading the annotated radar profile to a data base that is accessible by other vehicles.

* * * * *